United States Patent
Arafat et al.

(10) Patent No.: US 10,128,006 B2
(45) Date of Patent: Nov. 13, 2018

(54) CRYOGENIC SYSTEM FOR SPENT NUCLEAR FUEL POOL EMERGENCY COOLING AND SAFETY SYSTEM

(71) Applicant: Westinghouse Electric Company LLC, Cranberry Township, PA (US)

(72) Inventors: Yasir Arafat, Pittsburgh, PA (US); Jeffrey T. Dederer, Valencia, PA (US); Adam Torrance, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 802 days.

(21) Appl. No.: 14/880,564

(22) Filed: Oct. 12, 2015

(65) Prior Publication Data

US 2017/0103820 A1    Apr. 13, 2017

(51) Int. Cl.
    *G21C 15/18*    (2006.01)
    *G21C 19/07*    (2006.01)

(52) U.S. Cl.
    CPC ........... *G21C 15/182* (2013.01); *G21C 19/07* (2013.01); *G21C 2015/185* (2013.01)

(58) Field of Classification Search
    CPC . G21C 15/182; G21C 19/07; G21C 2015/185
    USPC .................................................... 376/272
    See application file for complete search history.

(56) References Cited

U.S. PATENT DOCUMENTS

| | | |
|---|---|---|
| 2012/0250813 A1 | 10/2012 | Lloyd et al. |
| 2013/0028365 A1 | 1/2013 | Tatli et al. |
| 2013/0121454 A1 | 5/2013 | Newton et al. |
| 2013/0136223 A1* | 5/2013 | Yeon ............... G21C 19/40 376/219 |
| 2014/0105348 A1 | 4/2014 | Lin-Hendel |
| 2015/0243385 A1 | 8/2015 | Singh et al. |

FOREIGN PATENT DOCUMENTS

JP    2012233698    11/2012

OTHER PUBLICATIONS

Westinghouse Electric Company, LLC, PCT/US2016/045676 Search Report, dated Nov. 11, 2016, 10 pages.

* cited by examiner

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

An emergency spent nuclear fuel pool cooling system that requires no external electrical power source and relies on the expansion of a cryogenic fluid through an evaporator/heat exchanger submerged within the spent fuel pool, to power various components used to cool the spent fuel pool and adjacent areas and provide makeup water to the spent fuel pool. Other than the evaporator/heat exchanger to which the cryogenic fluid is connected, the remaining components employed to cool the pool and the surrounding area and provide makeup water can be contained in a relatively small, readily transportable skid.

20 Claims, 5 Drawing Sheets

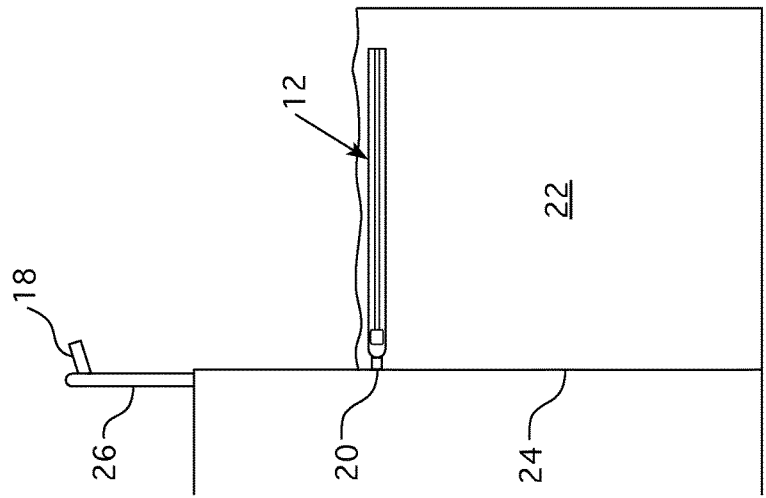
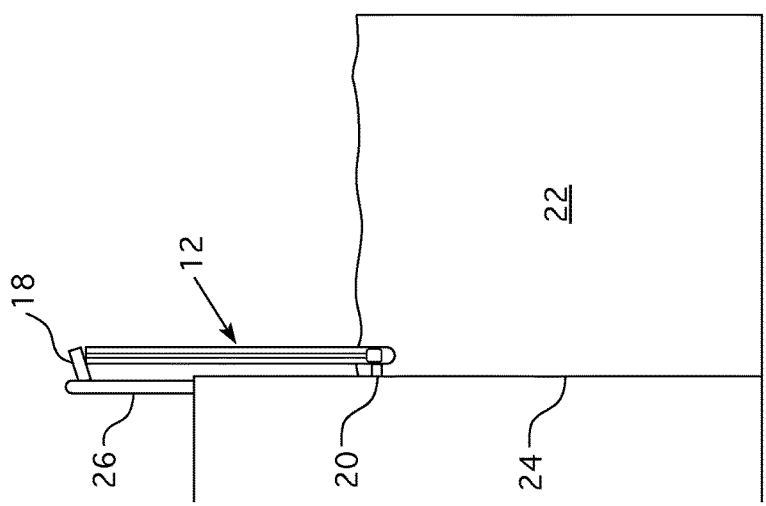
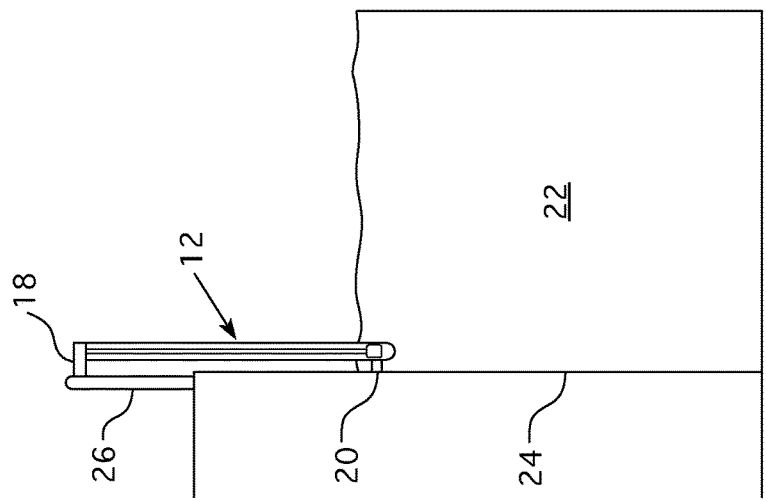

CRYOGENIC SYSTEM FOR SPENT NUCLEAR FUEL POOL EMERGENCY COOLING AND SAFETY SYSTEM

BACKGROUND

1. Field

This invention relates in general to spent nuclear fuel pools and, more particularly, to an emergency cooling system to maintain the safety of spent nuclear fuel pools.

2. Related Art

Pressurized water nuclear reactors are typically refueled on an eighteen month cycle. During the refueling process, a portion of the irradiated fuel assemblies within the core are removed and replaced with fresh fuel assemblies which are relocated around the core. The removed spent fuel assemblies are typically transferred under water to a separate building that houses a spent fuel pool in which these radioactive fuel assemblies are stored. The water in the spent fuel pools is deep enough to shield radiation to an acceptable level and through convective cooling and recirculation prevents the fuel rods within the fuel assemblies from reaching temperatures that could breach the cladding of the fuel rods, which hermetically house the radioactive fuel material and fission products. Cooling continues at least until the decay heat within the fuel assemblies is brought down to a level where the temperature and radiation emissions of the assemblies is acceptable for dry storage. Until such time, the water in the spent fuel pools is actively cooled by pumping a portion of that coolant through heat exchangers to extract the heat.

Current nuclear plants have acquired systems to effectively manage spent fuel cooling. However, certain emergency situations, such as a station blackout or an event causing the loss of an ultimate heat sink can lead to failure of the spent fuel pool cooling process. As a consequence, extensive temperature increase of the spent fuel pool inventory with the formation of steam can occur, and radioactive aerosols can possibly be released into the surrounding atmosphere. High concentrations of this radioactive aerosol and overheating of the air may lead to limited accessibility to the building and further impede emergency efforts. In an extremely unlikely event, such as where a catastrophic tsunami challenges plant systems beyond all reasonable predictions, such as occurred in Japan's Fukushima Daiichi Nuclear Power Plant, and where there is no cooling or inventory make-up for several days, the spent fuel pool may vaporize significant volumes of water and eventually dry up, posing the risk of fuel damage due to the inability to reject decay heat to a heat sink.

Currently, a number of existing plants have a spray system incorporated on top of the spent fuel pool, which distributes water from an external water source to replenish water in the pool. However, the system requires a pump which requires power and manual start-up to carry out this operation.

Accordingly, it is an object of this invention to provide a back-up spent fuel pool cooling system that does not require external power.

Furthermore, it is an object of this invention to provide such a cooling system that will initiate cooling of the spent fuel pool passively upon the occurrence of a preselected event.

Additionally, it is an object of this invention to provide such a cooling system that is relatively inexpensive and easy to implement.

It is a further object of this invention to provide such a cooling system that is not going to hinder normal fuel pool operations, when the system is not in use.

SUMMARY

These and other objects are achieved with a spent nuclear fuel pool emergency cooling system that employs an evaporator/heat exchanger having an internal fluid path that extends in a generally planar direction, with the evaporator/heat exchanger being supported substantially vertically from a wall of a spent fuel pool. The hinged support connects a first side portion of the evaporated/heat exchanger to the wall of the spent fuel pool with the hinged support configured to rotate the evaporator/heat exchanger away from the wall and outward into the coolant within the spent fuel pool with a second side portion of the evaporator/heat exchanger, which is opposed from the first side portion, laterally spaced from the wall of the spent fuel pool. A temperature sensitive fusible link is connected between the wall and the second side portion of the evaporator/heat exchanger to maintain the exchanger in the substantially vertical position. The fusible link is responsive to a preselected change in an element of an environment of the spent fuel pool, to a pre-established level, to transfer the evaporator/heat exchanger to the position wherein the second side portion of the evaporator/heat exchanger is laterally spaced from the wall of the spent fuel pool. A dewar or a cryogen pipeline containing a supply of a cryogenic fluid is provided and is fluidly connected to the internal fluid path with an automatic valve for preventing the flow of cryogenic fluid from the dewar/cryogen supply to the internal fluid path until the evaporator/heat exchanger is substantially in the position wherein the second side portion of the evaporator/heat exchanger is laterally spaced from the wall of the spent fuel pool.

Preferably, the position of the evaporator/heat exchanger wherein the second side portion is laterally spaced from the wall of the spent fuel pool places the evaporator/heat exchanger substantially in a horizontal position, where the heat exchanger is in contact with the spent fuel pool water. When the evaporator/heat exchanger is laterally spaced from the wall of the spent fuel pool, the automatic valve opens to allow the cryogenic fluid to collect heat from the spent fuel pool and expand itself into a gas through the internal fluid path wherein the gas exits the internal fluid path as a pressurized gaseous cryogenic fluid. In one embodiment, the pressurized gaseous cryogenic fluid is connected to a gas driven mechanical pump such as a gas operated double diaphragm pump which can be employed to passively supply make-up water to the spent fuel pool.

In another embodiment, the pressurized gaseous cryogenic fluid is connected to a compressed gas turbo generator which can be employed to generate power to assist an air cooling system. The pressurized gaseous cryogenic fluid exiting the internal fluid path can also be conducted through a gas to air heat exchanger after driving the compressed gas turbo generator to collect heat from the surrounding air. Preferably, a check valve is in fluid communication with an inlet to the evaporator/heat exchanger to prevent the pressurized gaseous cryogenic fluid from flowing back into the dewar. Furthermore, the internal fluid path may be placed in fluid communication with a pressure regulating valve and/or pressure dampener to control the pressure of the gaseous cryogenic fluid in the internal fluid path.

Desirably, aside from the evaporator/heat exchanger, substantially all of the plurality of components and instrumentation necessary for implementing the emergency cooling system can be supported on a readily transportable skid that can be back-fitted into existing plants. In one embodiment the gaseous cryogenic fluid is nitrogen. In another embodiment the gaseous cryogenic fluid is synthetic, breathable air (nitrogen and oxygen mixture) or another inert fluid.

Preferably, the evaporator/heat exchanger has an inlet and an outlet to the internal fluid path and the internal fluid path extends in a serpentine pattern between the inlet and outlet desirably through a single plane. The shape of the heat exchanger tubing may be of other forms, with a large enough heat exchange area to flash the cryogenic fluid. In another embodiment, the heat exchanger can be in any shape or form, including finned tubes, to facilitate heat transfer. In still another embodiment, the evaporator/heat exchanger is supported substantially vertically upward from the wall of the spent fuel pool and drops away from the wall upon release of the fusible link, by gravity.

BRIEF DESCRIPTION OF THE DRAWINGS

A further understanding of the invention can be gained from the following description of the preferred embodiments when read in conjunction with the accompanying drawings in which:

FIG. 2a is a schematic cross-sectional view of a spent fuel pool with the evaporator/heat exchanger of FIG. 1 hingedly supported from the spent fuel wall and attached in the vertical position to a handrail above the spent fuel pool, with a latch which is responsive to an environmental element of the spent fuel pool such as temperature, radiation level, etc.;

FIG. 2b is a schematic of the cross-sectional view illustrated in FIG. 2a showing the latch being activated;

FIG. 2c is a schematic of the cross-sectional view shown in FIGS. 2a and 2b with the evaporator/heat exchanger fully actuated and submerged within the spent fuel pool;

DESCRIPTION OF THE PREFERRED EMBODIMENT

This invention provides a system that can mitigate the decay heat removed from the used nuclear fuel assemblies in a spent fuel pool during a station blackout using the natural expansion forces of heating a cryogenic fluid. The term "cryogenic fluid" in this context is meant to include any fluid that is a liquid and has a boiling point at a temperature substantially below room temperature and the normal operating temperature of a spent fuel pool and that does not react with the substances that it comes in contact with in the system described hereafter, to adversely change its chemical composition. One embodiment includes the use of cryogenic nitrogen to achieve both water and space cooling and also utilizes the expanded gas to drive a make-up water pump to replenish spent fuel pool water and/or provide power to an air cooler system. The following describes three different embodiments incorporating this concept; two of which provide for spent fuel pool cooling alone while the third includes space cooling. The first embodiment utilizes an expanded cryogenic nitrogen gas to operate a compressed gas turbo generator to supply power to an electrical make-up water pump. The second embodiment uses the expanded nitrogen to operate a gas-operated double diaphragm pump to make up the lost water in a spent fuel pool. The third embodiment utilizes the expanded gas to drive an air blower for space cooling, in addition to operating a gas-operated operated double diaphragm pump as a make-up water source. These concepts are respectively shown in FIGS. 3, 4 and 5.

Figure 3:
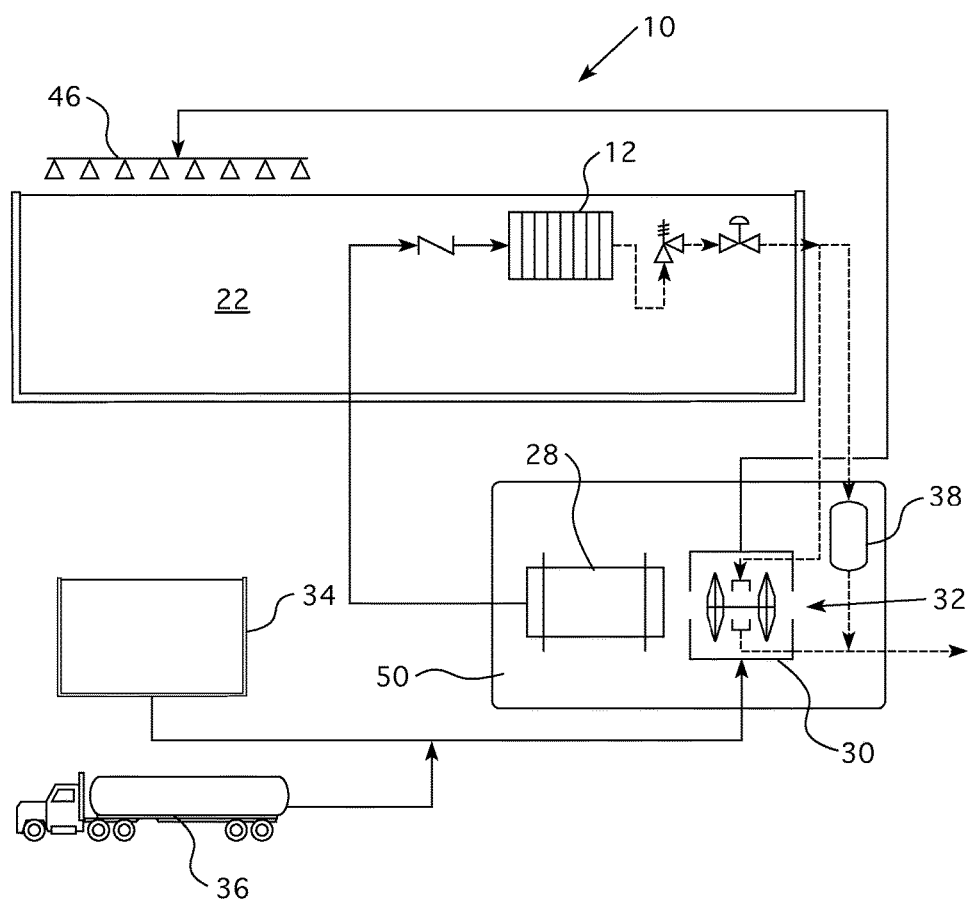
FIG. 3 is a schematic of one embodiment of this invention that employs a gas-operated double diaphragm pump to pump makeup water to the spent fuel pool.
Figure 4:
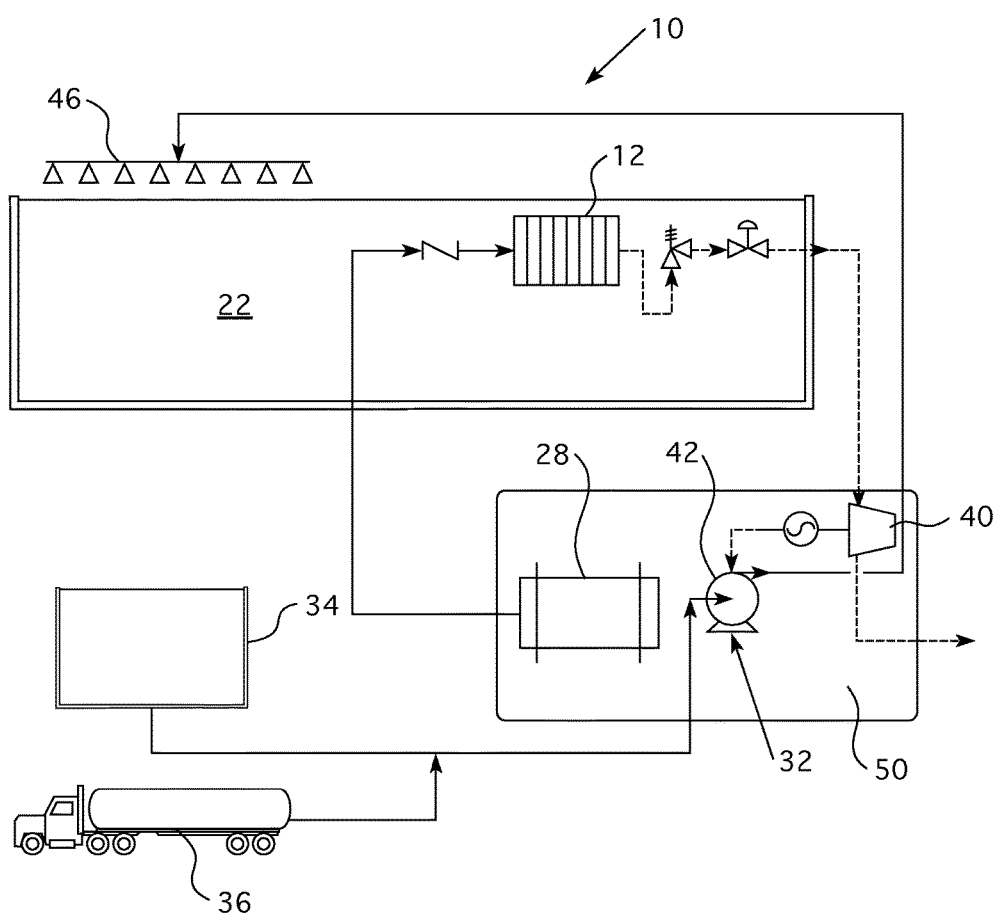
FIG. 4 is a schematic of another embodiment of this invention that employs a turbo generator to produce power.
Figure 5:
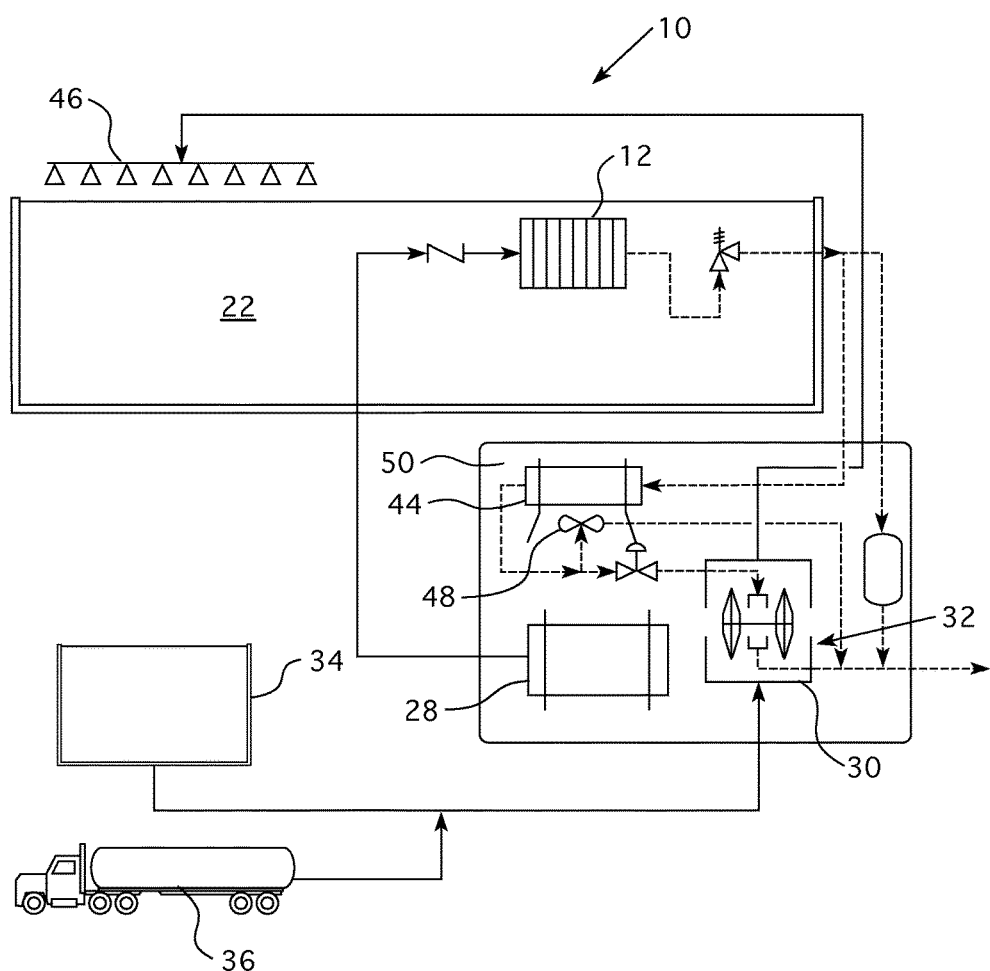
FIG. 5 is a schematic of a third embodiment of this invention that includes both water and space cooling.

By way of background, nitrogen is in its liquid state between the temperatures of −346 degrees and −325 degrees Fahrenheit (−198 Celsius) and is typically stored within highly insulated containers, i.e., dewars. This commodity is readily available commercially and is inexpensive. The system in accordance with this invention would include an on-site storage dewar 28 such as the one shown in FIGS. 3, 4 and 5. An additional embodiment for the storage dewar is for the dewar to be located on a skid, outside of the spent fuel pool building where it can be resupplied and refilled from an external source. The option of having the dewar on a skid inside the building is identified by reference character 28. The dewar 28 is connected to an evaporator/heat exchanger 12 with insulated piping and valves to transport the cryogen to the evaporator/heat exchanger. Gas-operated double diaphragm pumps such as the one identified by reference character 30 shown in FIGS. 3 and 5 are usually operated mechanically using a compressed gas, typically air. However, in this case the gas operated double diaphragm pumps are driven by flashed and heated cryogenic air or an inert gaseous cryogenic fluid, such as nitrogen. A gas operated double diaphragm pump is a positive displacement pump that utilizes a combination of the reciprocating action of a flexible diaphragm and valves on either side of the diaphragm to pump a fluid. Some gas-operated double diaphragm pumps operate at low head and low flow rates; however, others are capable of higher flow rates. Other advantages of the gas-operated double diaphragm pump are that it includes the ability to run dry and pump a wide range of fluids including slurries. Gas-operated double diaphragm pumps are able to achieve efficiencies as high as 97 percent. Usually such pumps are accompanied with pulse-dampeners, figuratively illustrated in FIG. 3 and denoted by reference character 38, to reduce a pulsating flow. An alternate embodiment to the gas-operated double diaphragm is to use a pump that can be driven by a cold pressurized gas. Another alternate embodiment is to use a compressed air driven power generator, such as a turbine. Gas-operated turbo generators are also common, but are generally driven by high temperature combustion gases. Such a system driven by a gaseous cryogenic fluid can produce electricity over long periods of time (depending on the size of the nitrogen supply tank) as a redundant, independent power generating system that can be of significant value during a station blackout.

Accordingly, this invention presents a spent fuel pool emergency cooling system, which is capable of carrying out multi-functional efforts to mitigate the decay heat of a spent fuel pool for a long period of time without the need of external power or human intervention. The major components of this system are a cryogenic fluid storage tank or dewar, a gas-operated diaphragm pump and an evaporator/heat exchanger. Besides the evaporator/heat exchanger, most of the components and instrumentation can be situated on a relatively small skid. The system also has the capability of cooling the ambient air in the spent fuel pool area effectively without the need of a large heat exchanger. In addition to the aforementioned components, the system would need another heat exchanger (gas to air) and a pneumatic fan or an eductor (if liquid air is used) to provide this additional option for space cooling.

Figure 1:
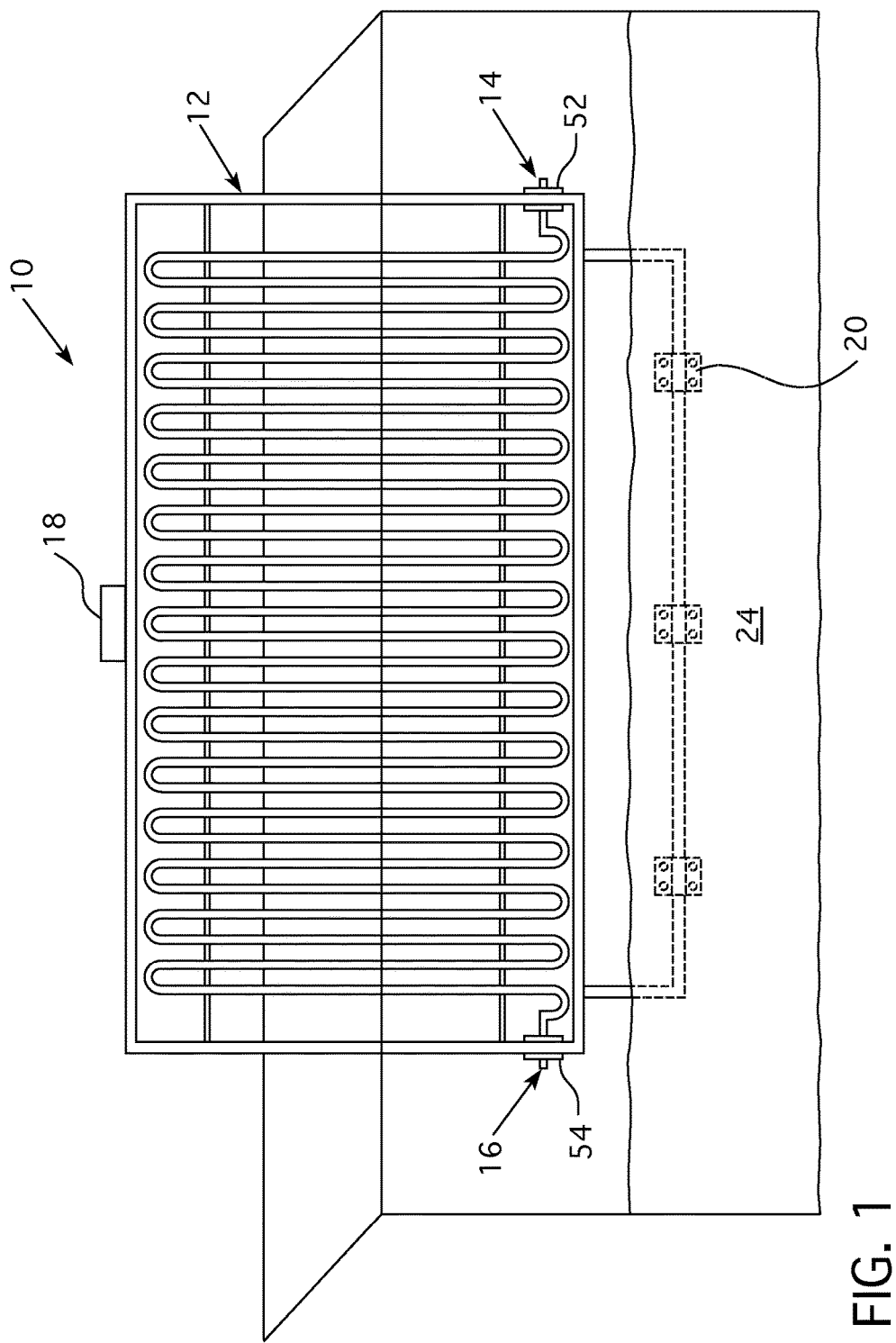
FIG. 1 is a schematic diaphragm of one embodiment of an evaporator/heat exchanger of this invention supported from a spent fuel pool wall.

One embodiment of the evaporator/heat exchanger 12 is shown in FIG. 1 and is designed such that it does not block or interfere with any regular operation in the spent fuel pool area. The evaporator/heat exchanger 12, in this embodiment, will be supported substantially in an upright position against the wall 24 of the spent fuel pool and will be lowered into the spent fuel pool only during an accident scenario. Preferably, the heat exchanger 12 is of a planar serpentine design as shown in FIG. 1, with an inlet 14 and an outlet 16. The evaporator/heat exchanger 12 is supported from the spent fuel pool wall 24 by hinged brackets 20 about which it can be rotated downward. The upper end is supported by a latch with a fusible link actuator 18 that may be extended from a handrail that surrounds portions of the spent fuel pool. During an accident, the evaporator/heat exchanger 12 can rotate down about the hinged brackets 20 by approximately 90 degrees. Preferably, the brackets 20 have a stop that prevents the evaporator/heat exchanger 12 from rotating substantially more than the 90 degree angle. The fusible latch 18 is preferably a temperature sensitive actuation device that passively opens its connection with the heat exchanger at a preselected temperature to allow the heat exchanger panel to be lowered onto the water surface by gravity. By the fusible link being passively actuated it is meant that no operator intervention or external power is required to implement the actuation. However, it should also be appreciated that other fusible links may be used, which are passively responsive to an element of the spent fuel pool environment to extend the evaporator/heat exchanger 12 into the spent fuel pool and/or turn on the cryogen supply to the inner tubes of the evaporator/heat exchanger. For example, the fusible link could be responsive to the level of coolant within the spent fuel pool to extend the evaporator/heat exchanger when the coolant level in the pool reached a preselected elevation or the fusible link could be responsive to a certain change in radiation level due to the reduced shielding resulting from a drop in the level of the spent fuel pool. This system can also be designed to have the evaporator/heat exchanger 12 submerged against the wall 24 of the spent fuel pool with the upper portion of the heat exchanger hinged against the sidewall of the spent fuel pool and the bottom of the evaporator/heat exchanger 12 tied against the wall with the fusible latch. In this latter embodiment the hinges 20 can be spring-loaded to permit the evaporator/heat exchanger to rotate upward when the fusible latch is activated at the preselected temperature. For this latter arrangement to be most effective, there has to be sufficient clearance between the evaporator/heat exchanger and the fixtures within the spent fuel pool.

FIGS. 2a, b and c illustrate the actuation of the evaporator/heat exchanger 12. FIG. 2a shows the evaporator/heat exchanger 12 supported adjacent the spent fuel pool wall 24 and held in that position by the fusible latch 18 that extends between the top of the evaporator/heat exchanger and a handrail 26 that surrounds at least a portion of the edge of the spent fuel pool. FIG. 2b illustrates the actuation phase in which the fusible latch 18 releases the top of the evaporator/heat exchanger 12 that enables the evaporator/heat exchanger 12 to rotate downward under the force of gravity. FIG. 2c illustrates the cooling phase in which the evaporator/heat exchanger is submerged in the spent fuel pool. Cooling of the water around the evaporator/heat exchanger 12 causes a natural convection current to form that moves the cooler water towards the bottom of the pool and the hotter water up towards the heat exchanger. The system is designed to allow a cryogenic fluid such as liquid air or nitrogen to flow into the evaporator/heat exchanger when the latter is fully submerged in the spent fuel pool. The liquid air or nitrogen starts flowing through the tubes of the evaporator/heat exchanger, gains heat of vaporization and flashes to a gas. A check valve 52 in the inlet stream of the evaporator/heat exchanger prevents the pressurized gas from flowing back into the dewar or cryogenic storage vessel 28. Also, the pressure relief valve 54 in the evaporator/heat exchanger ensures the pressure does not exceed the design pressure of the evaporator/heat exchanger tubes. As the gas flows through the evaporator/heat exchanger it will also gain sensible heat and cool down the surface region of the spent fuel pool. Warmer and less dense water at the bottom of the pool will then rise up forcing the cooled water to displace to the bottom, initiating the natural convection cooling circulation in the spent fuel pool.

The pressure regulating valve 54 assists the high pressure gaseous nitrogen to exit the outlet 16 of the evaporator/heat exchanger 12 and is fed to a make-up water pump 32 (FIGS. 3, 4 and 5) that can draw water from a storage tank 34 within the plant, from portable water trucks 36, or from an additional make-up water source located outside of the spent fuel pool building. The gas can be used to operate the make-up water pump 32 via two methods. The first is a gas-operated double diaphragm pump that will use pressurized gas to feed water to the spray system of the spent fuel pool as illustrated in FIG. 3. A pulse dampener 38 is provided to smooth out the peaks and valleys in the flow. The other method involves the use of pressurized gas to operate a small gas-powered turbo generator that will create electricity to operate an electrical pump 42 to feed water to the spent fuel pool spray system as shown in FIG. 4. It should also be appreciated that a mechanical pump could be connected to the shaft of a gas-powered turbine to provide a similar result.

In the embodiment shown in FIG. 3, the gas from the evaporator/heat exchanger 12 is fed to a gas-operated double diaphragm pump 30 to draw water from a make-up water tank 34 or from water trucks 36 to feed the water to the spent fuel pool make-up line or spray system 46. That pump would require a low head and low flow rate (estimated to be approximately 35 gallons per minute), which is achievable using a gas-operated double diaphragm pump. The gas-operated double diaphragm pump may require a pulse dampener 38 to maintain a relatively smooth flow rate. The overall system is very compact and aside from the evaporator/heat exchanger, substantially all of the components necessary for implementing the emergency cooling system can be supported on a readily transportable skid 50 that can be back-fitted into existing plants to mitigate the overheating of a spent fuel pool during a station blackout or during loss of an ultimate heat sink.

The embodiment illustrated in FIG. 4 has the capability to provide effective space cooling to cool down ambient air in the spent fuel pool area or other areas of a power plant. In this embodiment, the expanded gas from the evaporator/heat exchanger 12 flows into an air cooling heat exchanger 44 to extract heat from the ambient air. As seen in FIG. 4, a portion of the exit stream of the air cooling heat exchanger 44 is fed to a pneumatic fan 48 or an eductor (in the case when synthetic air is the fluid) attached to the air cooling heat exchanger 44 to enable forced convection to increase heat transfer between the air and the air cooling heat exchange tubes carrying cold gas. The forced convection by the pneumatic fan or eductor allows the air cooling heat exchanger 44 to be much smaller in size than a typical air cooler relying only on natural convection. This space cooler is compact, effective, and works without any external power. The space cooling feature can also be designed as a stand-alone system in a plant that requires emergency, passively activated air cooling during a station blackout or during normal operation. The space cooler makes the area more accessible to personnel to continue in other emergency efforts during a station blackout.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A spent nuclear fuel pool emergency cooling system comprising:
   an evaporator/heat exchanger having an internal fluid path that extends in a generally planar direction, the evaporator/heat exchanger being supported substantially vertically from a wall of a spent fuel pool;
   a hinged support connecting a first side portion of the evaporator/heat exchanger to the wall of the spent fuel pool, the hinged support configured to rotate the evaporator/heat exchanger away from the wall and outward into a coolant within the spent fuel pool with a second side portion of the evaporator/heat exchanger, which is opposed from the first side portion, laterally spaced from the wall of the spent fuel pool;
   a fusible link actuator that connects the wall and the second side portion of the evaporator/heat exchanger to maintain the evaporator/heat exchanger in the substantially vertical position, the fusible link actuator being responsive to a preselected change in an element of an environment of the spent fuel pool, to a pre-established level, to transfer the evaporator/heat exchanger to a position wherein the second side portion of the evaporator/heat exchanger is laterally spaced from the wall of the spent fuel pool;
   a supply of a cryogenic fluid fluidly connected to the internal fluid path;
   a cryogenic storage vessel for storing the supply of the cryogenic fluid; and
   a passively actuated valve for preventing the flow of the cryogenic fluid from the cryogenic storage vessel to the internal fluid path until the second side portion of the evaporator/heat exchanger is laterally spaced by a preselected extent from the wall of the spent fuel pool.

2. The spent nuclear fuel pool emergency cooling system of claim 1 wherein the position wherein the second side portion of the evaporator/heat exchanger is laterally spaced from the wall of the spent fuel pool places the evaporator/heat exchanger in a substantially horizontal position, to insure the evaporator/heat exchanger is submerged in the coolant of the spent fuel pool.

3. The spent nuclear fuel pool emergency cooling system of claim 1 wherein when the second side portion of the evaporator/heat exchanger is laterally spaced by the preselected extent from the wall of the spent fuel pool, the passively actuated valve opens to expand the cryogenic fluid through the internal fluid path wherein the cryogenic fluid captures heat and exits the internal fluid path as a pressurized gas.

4. The spent nuclear fuel pool emergency cooling system of claim 3 wherein the pressurized gas is connected to a gas driven mechanical pump.

5. The spent nuclear fuel pool emergency cooling system of claim 4 wherein the gas driven mechanical pump supplies makeup water to the spent fuel pool.

6. The spent nuclear fuel pool emergency cooling system of claim 4 wherein the gas driven mechanical pump is an air operated double diaphragm pump.

7. The spent nuclear fuel pool emergency cooling system of claim 6 wherein the air operated double diaphragm pump is connected to a pulse dampener.

8. The spent nuclear fuel pool emergency cooling system of claim 3 wherein the pressurized gas is connected to a compressed gas turbo generator.

9. The spent nuclear fuel pool emergency cooling system of claim 8 wherein the compressed gas turbo generator drives an air cooling system.

10. The spent nuclear fuel pool emergency cooling system of claim 8 wherein the compressed gas turbo generator provides power to an electrical pump.

11. The spent nuclear fuel pool emergency cooling system of claim 10 wherein the electrical pump supplies make-up water to the spent fuel pool.

12. The spent nuclear fuel pool emergency cooling system of claim 9 wherein the pressurized gas exiting the internal fluid path is conducted through a gas to air heat exchanger after driving the compressed gas turbo generator.

13. The spent nuclear fuel pool emergency cooling system of claim 3 including a check valve in fluid communication with an inlet to the evaporator/heat exchanger to prevent the pressurized gas from flowing back into the cryogenic storage vessel.

14. The spent nuclear fuel pool emergency cooling system of claim 3 wherein the internal fluid path is in fluid communication with a pressure regulating valve to control pressure of the gas in the internal fluid path.

15. The spent nuclear fuel pool emergency cooling system of claim 1 wherein aside from the evaporator/heat exchanger, a plurality of components and instrumentation necessary for implementing the emergency cooling system can be supported on a transportable skid that can be back fitted into existing nuclear power plants.

16. The spent nuclear fuel pool emergency cooling system of claim 1 wherein the evaporator/heat exchanger has an inlet and an outlet to the internal fluid path and the internal fluid path extends in a serpentine pattern between the inlet and the outlet.

17. The spent nuclear fuel pool emergency cooling system of claim 1 wherein the internal fluid path extends substantially through a single plane.

18. The spent nuclear fuel pool emergency cooling system of claim 1 wherein the evaporator/heat exchanger is supported substantially vertically upward from the wall of the spent fuel pool.

19. The spent nuclear fuel pool emergency cooling system of claim 1 wherein the cryogenic fluid is nitrogen or mixtures of nitrogen.

20. The spent nuclear fuel pool emergency cooling system of claim 3 wherein the pressurized gas is air.

* * * * *